United States Patent [19]

Ferguson et al.

[11] 4,274,645
[45] Jun. 23, 1981

[54] PORTO AUTO OIL EASY DRAIN

[76] Inventors: Arthur Ferguson, c/o George Spector, 3615 Woolworth Bldg., 233 Broadway; George Spector, 3615 Woolworth Bldg., 233 Broadway, both of New York, N.Y. 10007

[21] Appl. No.: 48,719

[22] Filed: Jun. 15, 1979

[51] Int. Cl.³ .............................................. B62B 1/18
[52] U.S. Cl. ................................ 280/47.26; 184/1.5; 184/106
[58] Field of Search ................... 280/47.26; 184/106, 184/1.5; 292/256.67, 256.73

[56] References Cited

U.S. PATENT DOCUMENTS

| 1,544,356 | 6/1925 | Spaeth | 280/47.26 |
| 2,035,093 | 3/1936 | Nielsen | 184/1.5 |
| 2,531,765 | 11/1950 | Burress | 184/1.5 |
| 2,915,330 | 12/1959 | Verbiar | 292/256.67 |
| 3,262,713 | 7/1966 | Crawford, Sr. | 280/47.26 |
| 3,356,383 | 12/1967 | Sneed | 280/47.26 |
| 3,667,573 | 6/1972 | Edwards | 184/1.5 |

Primary Examiner—Randolph A. Reese
Assistant Examiner—D. W. Underwood

[57] ABSTRACT

A drain oil collection tank for use in an automobile service station, the device including a thirty gallon tank mounted on a hand cart, a drain valve at the bottom of the tank, a screen covered funnel extending telescopically adjustable upward from a cover of the tank and an oil level gauge in the tank.

1 Claim, 4 Drawing Figures

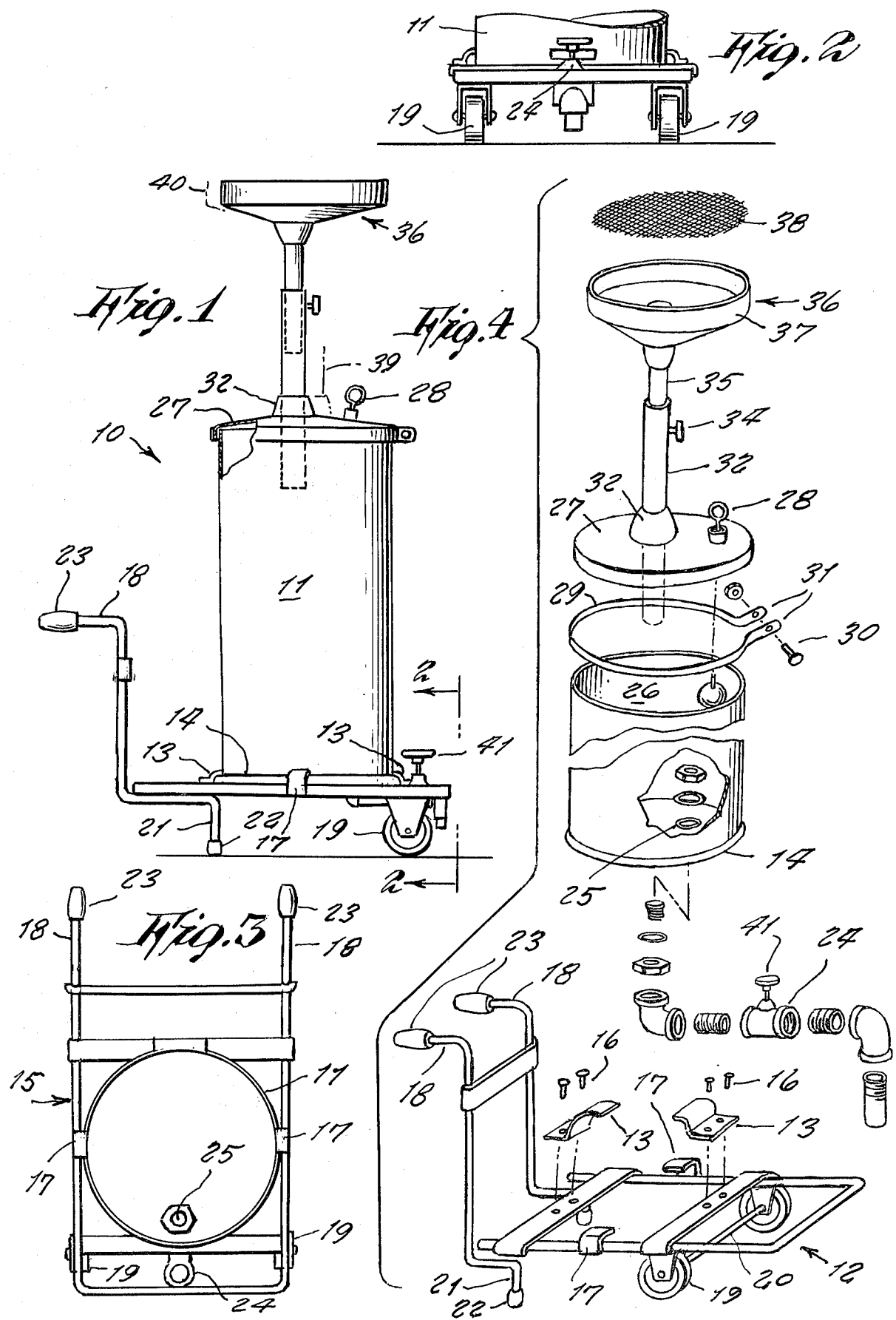

PORTO AUTO OIL EASY DRAIN

This invention relates generally to automotive service station equipment.

It is well known to automobile service mechanics that a conventional drain oil collection can hold only enough oil drained from a crankcase of approximately two average cars, after which the can must be emptied in order to service more vehicles requiring an oil change. Draining out the can frequently is a chore that takes up too much time so that this situation is therefore in need of an improvement.

Accordingly, it is a principal object of the present invention to provide a device that includes a thirty tank so that it can service at least thirty cars before requiring to be emptied.

Another object is to provide a device wherein the tank is mounted on a hand cart so that it can be moved about with relatively little effort.

Still another object is to provide a device wherein the tank includes a bottom drain valve, for easy draining thereof.

FIG. 1 is a side view of the invention, and showing one design thereof wherein the drain lid includes an eccentric top opening and the drip oil catching pan is also eccentric on its drain pipe, thus allowing a precise complete adjustment of the pan position under a car, by simply rotating the pan or lid, so to elliminate need to move around the entire apparatus.

FIG. 2 is a view in direction 2—2 of FIG. 1.

FIG. 3 is a top view of the assembly without the drain lid.

FIG. 4 is an exploded perspective view of the invention components.

Referring now to the drawing in greater detail, the reference numeral 10 represents a porto auto oil easy drain device according to the present invention, wherein there is a thirty gallon tank 11 mounted upon a hand cart 12 by means of clamps 13 grasping a lower head 14 of the tank and being screwed, upon the cart frame 15 by means of screws 16 after the head has first been slided under side clamps 17 welded on the cart frame.

The cart includes a pair of raised handles 18 formed on a rear end of the frame. A pair of wheels 19 on an axle 20 support a front of the frame, while a pair of legs 21 fitted in rubber caps 22 support a rear of the frame. The legs are a downward continuation of the handles which are fitted with hand grips 23.

The tank is cylindrical in shape and stands upright on the cart. A drain valve 24 is mounted in a bottom opening 25 of the tank, and includes the various pipe fittings such as pipe, sleeves elbows, washers and nipple, as shown in FIG. 4.

A top of the tank has an opening 26 that is closable by a cover 27. An oil level guage 18 is mounted through the cover, so a mechanic knows when the tank is getting filled up. A ring clip 29 encircles the cover, and a bolt set 30 fitted through ends 31 of the clip serves to tightened the ring therearound and lock the cover on the tank. An eccentrically positioned, upward flange 32 on the cover has a pipe 33 vertically therethrough, and a set screw 34 along the pipe adjustably secures a pipe 35 therein which is a lower end component of a funnel 36, the funnel basin 37 being made eccentric on the pipe 35. A screen 38 is removably fitted in the funnel basin, so to catch any drain cap or screws which are removed from a car when opening up a crankcase drain hole.

In operative use, it is now evident that the device 10 can be readily wheeled into position under a car for allowing crank case oil to drain therein. If the position of the device 10 is not precisely accurate enough the rotation of the cover and rotation of the funnel, makes a quick and easy adjustment for the same as shown by dotted lines at 39 and 40. When the tank 11 needs to be drained, the valve handle 41 is manually turned and the oil is flowed outward therefrom without the usual mess that occurs with emptying a conventional collection can.

What is claimed:

1. A porto auto oil easy drain device, comprising in combination a tank mounted upon a hand cart, said cart including a frame with a wheel support at the front and a leg support at its rear, said frame including a handle at its rear, said tank having a drain valve at its bottom, an upper end of said tank being open and closable by a cover rotatably mounted thereon having an eccentrically positioned, vertical pipe inlet therethrough supporting a funnel rotatably mounted in said pipe, including means for affixing said cover and said funnel wherein said funnel comprises a pipe outlet mounted in said inlet and a basin eccentrically mounted thereupon, said means comprising a ring retainer fitted about said cover and a set screw connecting said inlet and outlet, said drain valve disposed within said frame having an outlet orifice adjacent said front.

* * * * *